United States Patent [19]
Sato

[11] Patent Number: 6,087,966
[45] Date of Patent: Jul. 11, 2000

[54] KEYBOARD DEVICE HAVING HEIGHT CHANGEABLE KEY TOPS

[75] Inventor: Yoshitsugu Sato, Kuwana, Japan

[73] Assignee: Brother Kogyo Kabushiki Kaisha, Nagoya, Japan

[21] Appl. No.: 09/039,445

[22] Filed: Mar. 16, 1998

[30] Foreign Application Priority Data

Mar. 14, 1997 [JP] Japan ................................... 9-061372

[51] Int. Cl.$^7$ ................................................. H03M 11/00
[52] U.S. Cl. ........................... 341/22; 200/5 A; 200/345; 361/680; 400/482
[58] Field of Search .......................... 341/22, 20; 200/5 A, 200/344, 345; 361/680; 400/682

[56] References Cited

U.S. PATENT DOCUMENTS

| | | | |
|---|---|---|---|
| 5,463,195 | 10/1995 | Watanabe | 200/5 A |
| 5,519,569 | 5/1996 | Sellers | 361/680 |
| 5,587,875 | 12/1996 | Sellers | 361/680 |
| 5,635,928 | 6/1997 | Takagi | 341/22 |
| 5,735,390 | 4/1998 | Takagi | 200/344 |
| 5,767,464 | 6/1998 | Dyer | 200/344 |
| 5,852,194 | 12/1998 | Lin | 341/22 |
| 5,995,025 | 11/1999 | Sternglass | 341/22 |

*Primary Examiner*—Michael Horabik
*Assistant Examiner*—Albert K. Wong
*Attorney, Agent, or Firm*—Oliff & Berridge, PLC

[57] ABSTRACT

A keyboard device, in which the rotation of a cover to a closed position is transferred to racks via pawls attached to the shaft of the cover. The force applied by the pawls forces the racks to slide in the direction E and causes cam gears to rotate in the counterclockwise direction. Cam grooves in the cam gears also move in the rotated direction of the cam gears, forcing operating pins engaged in the cam grooves to slide from a first engaging position to a second engaging position. While the operating pins slide relative to the cam grooves, sliding of a circuit board orthogonal to the direction C is corrected by the engaged condition of guide slots and guide pins. Therefore, the operating pins are pressed against the supporting shaft sides of the cam grooves and slid in the C direction, relative to the cam grooves, to the second engaging position. Accordingly, a reinforcer on which the operating pin is fixed and the circuit board are slid in the direction C.

22 Claims, 7 Drawing Sheets

KEYBOARD DEVICE HAVING HEIGHT CHANGEABLE KEY TOPS

BACKGROUND OF THE INVENTION

1. Field of the Invention

The present invention relates to a keyboard, device mounted in a thin electronic device such as a notebook-type word processor or personal computer and having key tops whose height can be switched between an operating position and a non-operating position. The present invention particularly relates to a keyboard device, wherein the height of the key tops can be switched by a switching member between the operating position, in which the key tops are raised up, and the non-operating positions, in which the key tops are lowered down, according to the relative sliding movement of a slide member and a holder member.

2. Description of the Related Art

Notebook-type word processors, computers, and the like have quickly become in wide-spread use in recent years due to their excellent portability. In order to further improve the portability of these notebook-type devices, various proposals have been submitted regarding the keyboard include in such devices in an effort to reduce the overall thickness of the devices.

One such proposal is changing the height of the key tops in the keyboard of a notebook device through opening and closing of the device's cover.

SUMMARY OF THE INVENTION

A keyboard device is conceivable which includes switching members for elastically supporting guiding/supporting members; a circuit board to which the switching members are fixed; a holder member for supporting the guiding/supporting members and a supporting member for supporting the circuit board. The circuit board is slidably supported between the holder member and the supporting member and slides according to opening and closing operations of tho cover. When the cover in opened, the key tops are moved upward to an operating position via the movement of the circuit board. When the cover is closed for carrying, the key tops are moved downward to a non-operating position.

However, in a keyboard with the configuration described above, an urging means such as a spring is fixed at both ends between a reinforcing plate on the circuit board and the inside surface of the keyboard device. The restitutive force of the urging means maintains the operating position of the circuit board, that is, the height of the key tops, and secures the functionality of the key tops. With this urging means, a driving force larger than the urging force of the spring must be transferred to the circuit board in order to be able to slide the circuit board to the non-operating position and move the key tops to the lower non-operating position. Further, since the supporting member supporting the key tops and the switching member contact each other when changing the height of the key tops, frictional resistance is generated at the point of contact. Hence, a driving force greater than the urging force of the spring and this frictional resistance combined must be transferred to the circuit board in order to move the key tops to the non-operating position.

Further, when the cover of the notebook-type device is closed, the spring constantly applies a force to the reinforcing plate of the circuit board and the body of the keyboard device forcing the same to change shape over time, which phenomenon is known as creep. In addition, the hardness of the reinforcing plate and the body of the keyboard device can change according to rising temperatures in the environment in which the notebook device in used and in the interior of the keyboard device, due to heat generated from electronic parts in the device. Such temperature rises can further cause deformation of the reinforcing plate and keyboard body. An a result, a material having sufficient rigidity to withstand these conditions must be used in the reinforcing plate and the keyboard body. However, since light weight is necessary to improve the portability of the notebook device, there is a limit to the rigidity and strength of materials that can be used in the device.

In view of the foregoing, it is an object of the present invention to provide a keyboard device that is capable of changing the height of the key tops in association with opening and closing movements of the cover, while both eliminating the urging device described above and reducing the operating load on the cover.

This and other objects of the present invention will be attained by a keyboard device including key tops; guiding/supporting members for supporting the key tops and guiding the key tops in a vertical movement; holder member for supporting the guiding/supporting members; a slide member disposed beneath the holder member; switching members disposed on the slide member for performing a switching operation according to downward movement of the key tops; a driving device for sliding the slide member relative to the holder member and between a first position. in which the key tops are disposed upward, and a second position, in which the key tops are disposed downward; and a driving force amplifying device for amplifying the driving force of the driving device and transferring that force to the slide member or the holder member.

With a keyboard device of this configuration, the guiding/supporting members are mounted an the holder member and support the key tape. When the slide member is in a first position, the key tops are disposed in an upper position according to the switching member disposed on the slide member. In other words, the key tops are in an operating position in which they can be operated on by a user. A driving force applied by the driving device is amplified and transferred by the driving force amplifying device. The amplified force In transferred to either the slide member or the holder member in order to slide the slide member in relation to the holder member. Accordingly, the slide member is slid from a first position to a second position, at which time the guiding/supporting members move in relation to the switching members. The key tops, which were supported in the upper position by the switching members, are guided to the lower position by the guiding/supporting members. Hence, the key tops are moved from the operating position to the non-operating position and can no longer be operated on by the user.

From this state, if a driving force in applied in the opposite direction by the driving device, the key tops will be returned to the upper position according to a process opposite that described above. In other words, the driving force of the driving device is amplified by the driving force amplifying device and transferred to either the slide member or the holder member, causing the slide member to move relative to the holder member and from the second position to the first position. As a result, the key tops, which began in the lower position, are returned to the upper position by the switching members. Hence, the key tops are changed from the non-operating position to the operating position.

According to another aspect of the invention, the driving force amplifying device of the keyboard devices includes an open/close cover rotatably supported via a supporting shaft between a closed position and an open position; pawls disposed on the open/close cover; rack members each forced with depression for engaging with the pawls and having gear teeth along one part; operating members disposed on either the slide member or their holder member; and cam gear members connected to the operating members and each formed with cam portions having gear teeth for engaging with the rack members.

With a keyboard device of the above configuration, the open/close cover rotates about the supporting shaft, and the pawls on the cover rotate along with the cover when the cover is rotated open from the closed position. The pawls are engaged in the depressions of the rack members and move the rack member in a certain direction. Since the gear teeth of the rack members are engaged with the gear teeth of the cam gear members, the cam gear members are rotated in one direction along with the movement of the rack members. The cam portions of the cam gear members are connected with the operating members provided on either the slide member or the holder member and can force the operating members to move through rotation of the cam gear members. As a result of this movement, the slide member is slid in relation to the holder member from a first position to a second position.

In the reverse process, that is, when the open/close cover is rotated from an open position to the closed position, the pawls also rotate in the reverse direction, and the rack members are moved in the direction opposite that described above according to the engagement of the pawls in the depressions of the rack members. Along with the movement of the rack members, the cam gear members also rotate in the direction opposite that described above, causing the operating members to move is the opposite direction. An a result, the slide member is slid in relation to the holder member from the second position to the first position.

According to another aspect of the invention, the pawls engage in a state of no load with the depressions of the rack members when the open/close cover is in the closed position.

According to still another aspect of the invention. the driving force amplifying device further includes elastic members disposed on the rack members for engaging with the pawls; and releasing devices for disengaging the pawls from the elastic members when the open/close cover is rotated open more than a prescribed angle from the closed position.

With a keyboard device of this configuration, the pawls engage with the elastic members while the open/close cover is moved between the closed position and a prescribed angle from the closed position. Accordingly, the rack members and cover operate in association with each other. Therefore, when the cover is opened to a prescribed angle from the closed position, the rack members are driven along with the cover, causing the slide member to slide in relation to the holder member from the first position to the second position.

Further, when the cover reaches the prescribed angle from the closed position, the elastic members are elastically deformed according to a load applied by the releasing devices, and the pawls are disengaged from the elastic members. At this point, the association of the rack members and the cover is disengaged. Accordingly, the cover can open beyond the prescribed angle from the closed position without further driving the rack members. During the process of closing the cover, when the cover reaches the prescribed angle from the closed position, the load applied by the releasing devices is canceled, allowing the elastic members to return to a flat condition according to the restitutive force of the elastic members themselves, thereby re-engaging the pawls and the elastic members. Accordingly, the rack members again operate in association with the cover.

According to yet another aspect of the invention, the slide member includes an elastic body upon which the switching members are disposed; reinforcing members provided one on either side of the elastic body in the sliding direction of the slide member; and at least one connecting member connecting the pair of reinforcing members.

With a keyboard device of this configuration, the pair of reinforcing members are provided on the elastic body and are connected by the at least one connecting member in order to increase the rigidity of the slide member. An a result, the elastic body can slide without bending when the slide member slides relative to the holder member.

According to further aspect of the invention, the keyboard device further includes first guiding members disposed on the holder member for contacting the side surfaces of the connecting members and guiding the connecting members in the sliding direction.

With a keyboard device of this configuration, the slide member can be prevented from varying in a direction orthogonal to the sliding direction when the slide member slides relative to the holder member.

According to another aspect of the invention, surfaces of the key tops or guiding/supporting members and the switching members that contact each other when the slide member is slid relative to the holder member and between the first position and the second position are formed in a curved shape.

With a keyboard of this configuration, the slide member can all smoothly relative to the holder member according to these curved surfaces.

According to another aspect of the invention, the keyboard device further includes at least two slide grooves disposed on the slide member and formed as elongated holes; and second guiding members disposed on the holder member and engaged with the slide grooves for guiding the slide member in the sliding direction.

With a keyboard device of this configuration, the slide grooves aria elongated in the sliding direction of the slide member. When the slide member slides relative to the holder member and between the first position and the second position, the second guiding members move within the elongated slide grooves and guide the slide member in the slide direction. Accordingly, the slide member can slide relative to the holder member without varying in a direction orthogonal to the sliding direction.

According to another aspect of the invention, the keyboard device further includes third guiding members disposed on the holder member and contacting the side surfaces of the slide member for guiding the slide member in the sliding direction. With a keyboard devices of this configuration, the third guiding members can guide the slide member in the sliding direction, when the slide member slide relative to the holder member and between the first position and the second position.

BRIEF DESCRIPTION OF THE DRAWINGS

The particular features and advantages of the invention as well as other objects will become apparent from the following description taken in connection with the accompanying drawings, in which.

DETAILED DESCRIPTION OF THE PREFERRED EMBODIMENT

Figure 1:
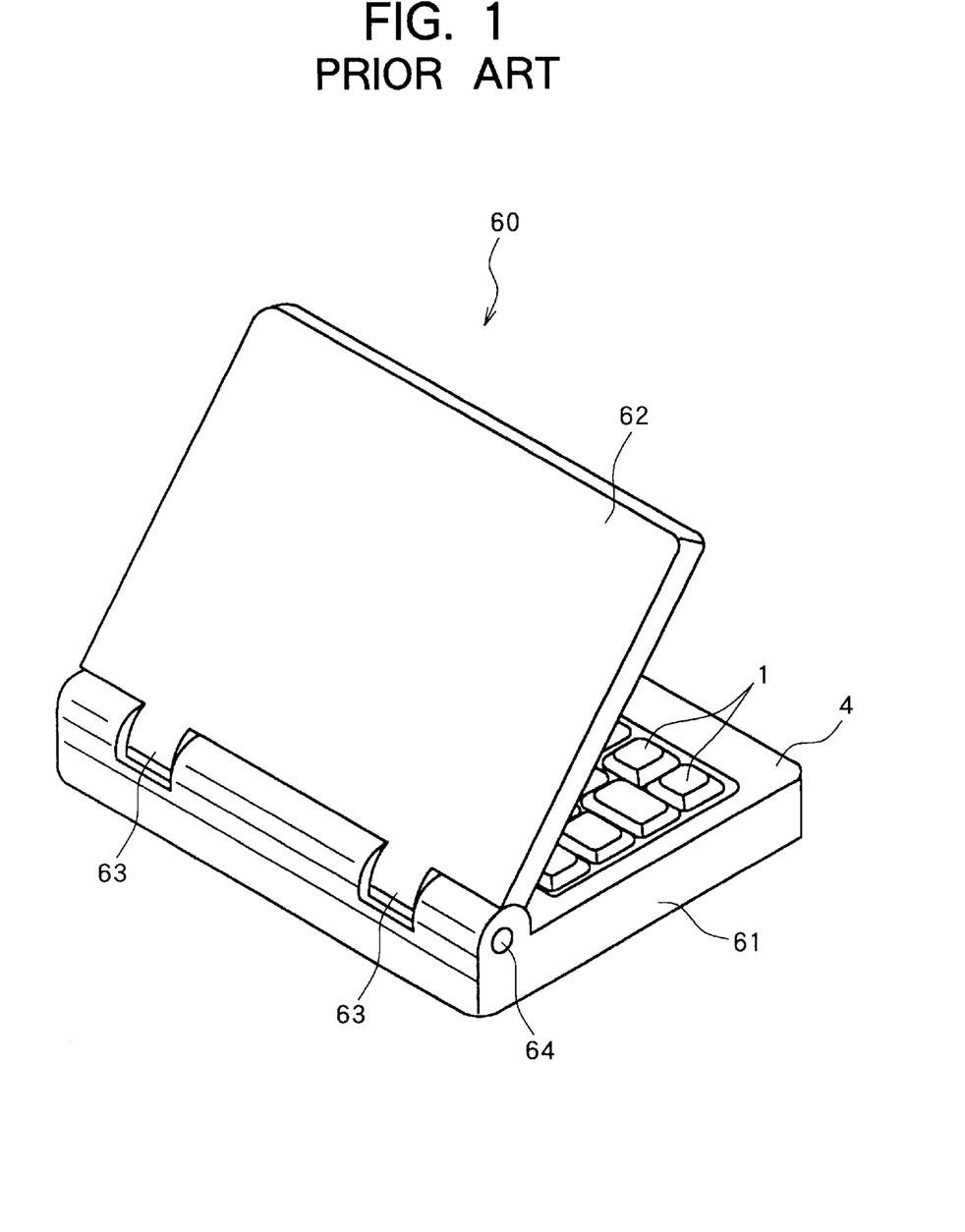
FIG. 1 is a perspective view of a notebook-type word processor provided with a keyboard device according to the embodiment of the present invention.

A keyboard device according to a preferred embodiment of the present invention will be described while referring to the accompanying drawings. FIG. 1 is a perspective view of a notebook-type word processor 60 well known in the art. The word processor 60 is provided with a keyboard device 61 and an open/close cover 62 having a liquid crystal display fixed on the inner side of the cover 62.

The keyboard device 61 is an input device well known in the art and is used for inputting data into the word processor 60. A plurality of key switches 1 is disposed in the keyboard device 61. Data is entered into the word processor 60 by operating these key switches 1. In addition. a supporting shaft 64 is rotatably (or pivotably) provided in one side of the keyboard device 61.

The open/close cover 62 is disposed on top of the keyboard device 61. Hinges 63 are formed in two places an one side of the open/close cover 62. The supporting shaft 64 penetrates tho hinges 63 to fix the open/close cover 62 to the keyboard device 61. Accordingly, the open/close cover 62 can be rotated (or pivoted) by a user from a closed position to an open position through the function of the supporting shaft 64.

Next, the construction of the key switches 1 provided in the keyboard device 61 will be described with reference to FIGS. 1–5.

Figure 2:
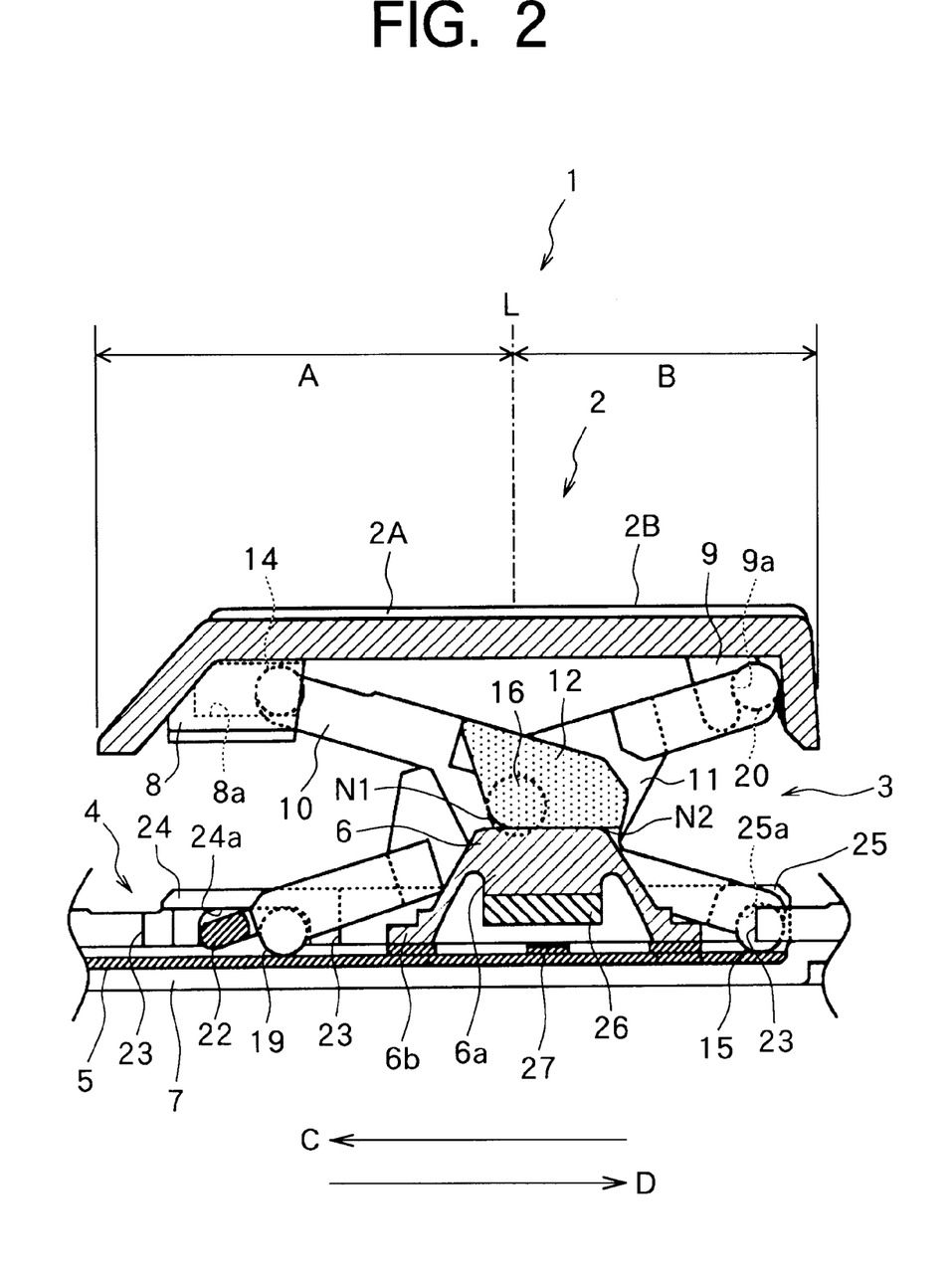
FIG. 2 is at side cross-sectional view of a key switch when the key tops are in the operating position.

FIG. 2 is a side cross-sectional view of a key switch in the operating position. As shown in FIG. 2, the key switches 1 include key tops 2; guiding/supporting members 3 for guiding the key tops 2 in a vertical movement while maintaining the same in a horizontal disposition; a holder member 4 for supporting the guiding/supporting members 3; a circuit board 5 disposed below the holder member 4; rubber springs 6 disposed below the guiding/supporting members 3 and fixed to the top of the circuit board 5; and a supporting plate 7 for supporting the lower surface of the circuit board 5.

Each of this key tops 2 is formed from a synthetic resin such as ABS (acrylonitrile-butadiene-styrene) resin. The top surface of the key top 2 is printed with a distinguishing character, symbol, or the like. As shown in the drawing, the key top 2 in divided into a front portion 2A and a back portion 2B along the plane L, which is described later. Here, the front portion 2A is slightly longer than the back portion 2B.

A pair of anchor units 8 (only one of the pair is shown in FIG. 2) in provided on the underside of the front portion 2A protruding downward. A long slot 8a is formed in each of the anchor units 8. A pair of anchor units 9 (only one of the pair is shown in FIG. 2) is provided on the underside of the back portion 2B protruding downward. A circular engaging hole 9a is formed in each of the anchor units 9.

Before describing the guiding/supporting member 3, the holder member 4 of the key switch 1 will be briefly described with reference to FIG. 2. Similar to the key top 2, the holder member 4 is formed from ABS resin or the like. Although one holder member 4 is described here as being provided for each key switch 1, in the keyboard device 61 according to the present embodiment, the holder member 4 is formed in one piece that serves each key switch 1 provided in the keyboard device 61.

Mounting holes 23 are provided in the holder member 4 to correspond to each of the key switches 1. The rubber springs 6 fixed to the circuit board 5, as described above, are free to slide within these mounting holes 23. Viewed from above, the mounting holes 23 are shaped approximately like rectangles. A pair of anchoring units 24 (only one of the pair is shown) is formed in the left-side corners of that rectangle. These anchor units 24 are disposed in opposition to the anchor units 8 of the key top 2 and form long groove-shaped slots 24a. In the right-side corners of the rectangle, a pair of anchor units 25 (only one of the pair is shown) is formed, opposing the anchor units 9 of the key top 2. Circular engaging holes 25a are formed in the anchor units 25.

The guiding/supporting member 3 includes a link member 10 and a link member 11 that are reciprocally supported and rotatable. Next, the link members 10 and 11 will be described with reference to FIGS. 3 and 4.

Figure 3:
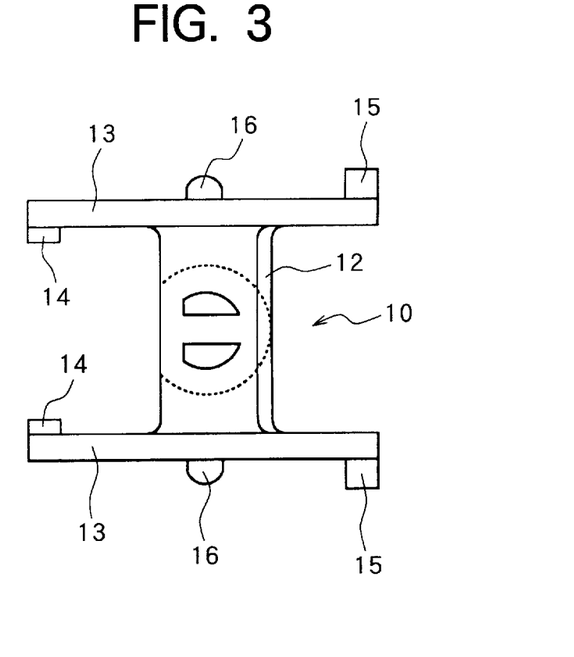
FIG. 3 is a plan view of one link member.

FIG. 3 in a plan view of the link member 10. The link member 10 is formed from a polyacetal resin or the like. When viewed from the top, the link member 10 is shaped approximately like the letter H. The link member 10 includes a base 12; a pair of sides 13 formed one on each end of the base 12; a pair of cylindrical sliding pine 14 provided on the inner sides and on one end of the sides 13; a pair of cylindrical engaging pins 15 disposed on the outer sides and on the opposite and of the sides 13; and a pair of pivot shafts 16 having rounded top surfaces protrude from approximately the center of the outer sides of the sides 13.

The base 12 is positioned in the center area of the link member 10. The bottom surface of the base 12 is formed in a curved shape, indicated by the dotted line in FIG. 3. As shown in FIG. 2. a curved surface N1 is formed in the lower left side of the base 12. This curved surface N1 contacts the top of the rubber spring 6.

The sliding pins 14 are slidably supported in the slots 8a of the anchor units 8 formed on the front portion 2A of the key top 2. The engaging pins 15 are rotatably maintained in the engaging holes 25a of the anchor units 25. The pivot shafts 16 penetrate the approximate centers in the outer surfaces of the sides 13.

Figure 4:
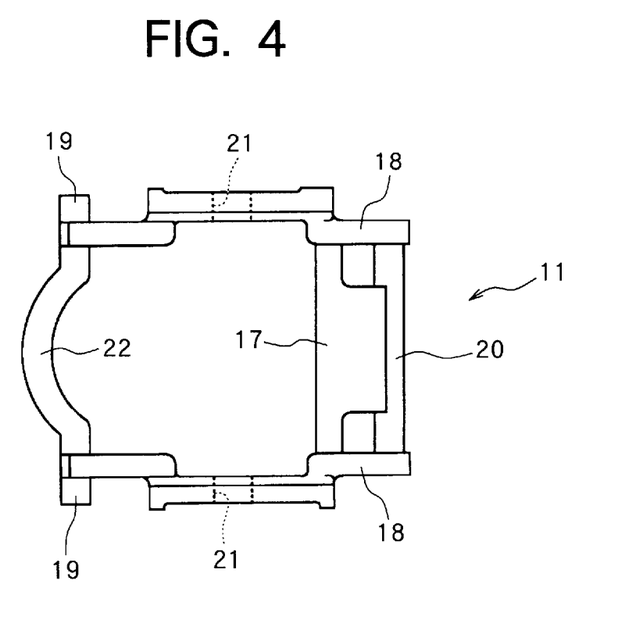
FIG. 4 is a plan view of another link member.

FIG. 4 is a plan view of the link member 11. The link member 11 is also formed from a polyacetal resin or the like. When viewed from the top, the link member 11 is shaped approximately like a rectangle. The link member 11 includes a base 17; a pair of sides 18 formed one on each and of the base 17; a connecting unit 22 for connecting the ends of the pair of sides 18 opposite the base 17; a pair of cylindrical sliding pins 19 disposed on the outer sides and on one end of the sides 18 (the left end in FIG. 4); a cylindrical engaging shaft 20 disposed between the opposite ends of the sides 18; and a pair of pivot holes 21 penetrating approximately the center of the sides 18.

The cylindrical sliding pin 19 are slidably maintained in the slots 24a of the anchor units 24, as shown in FIG. 2. The connecting unit 22, shown in FIG. 4, is disposed an the inner side of the sides 18 at the same and as the cylindrical sliding pins 19. The center of the connecting unit 22 arcs outward in order to fit the shape of the rubber spring 6.

The engaging shaft 20 is rotatably maintained in the engaging holes 9a of the anchor units 9, which are formed in the back portion 2B of the key top 2. The pivot shafts 16, which penetrate the sides 13, are pivotably supported in the pivot holds 21.

As described above, the guiding/supporting member 3 is configured by pivotably supporting the pivot shafts 16 of the link member 10 in the pivot holes 21 of the link member 11. Accordingly, each link member 10 and link member 11 is capable of pivoting upward and downward in relation to the other like the blades of scissors. Further, the centers of the pivot shafts 16 are set at equal distances from the centers of the sliding pins 14 and the centers of the engaging pins 15; while the centers of the pivot holes 21 are set at equal distances from the centers of the sliding pins 19 and the centers of the engaging shaft 20.

Figure 5:
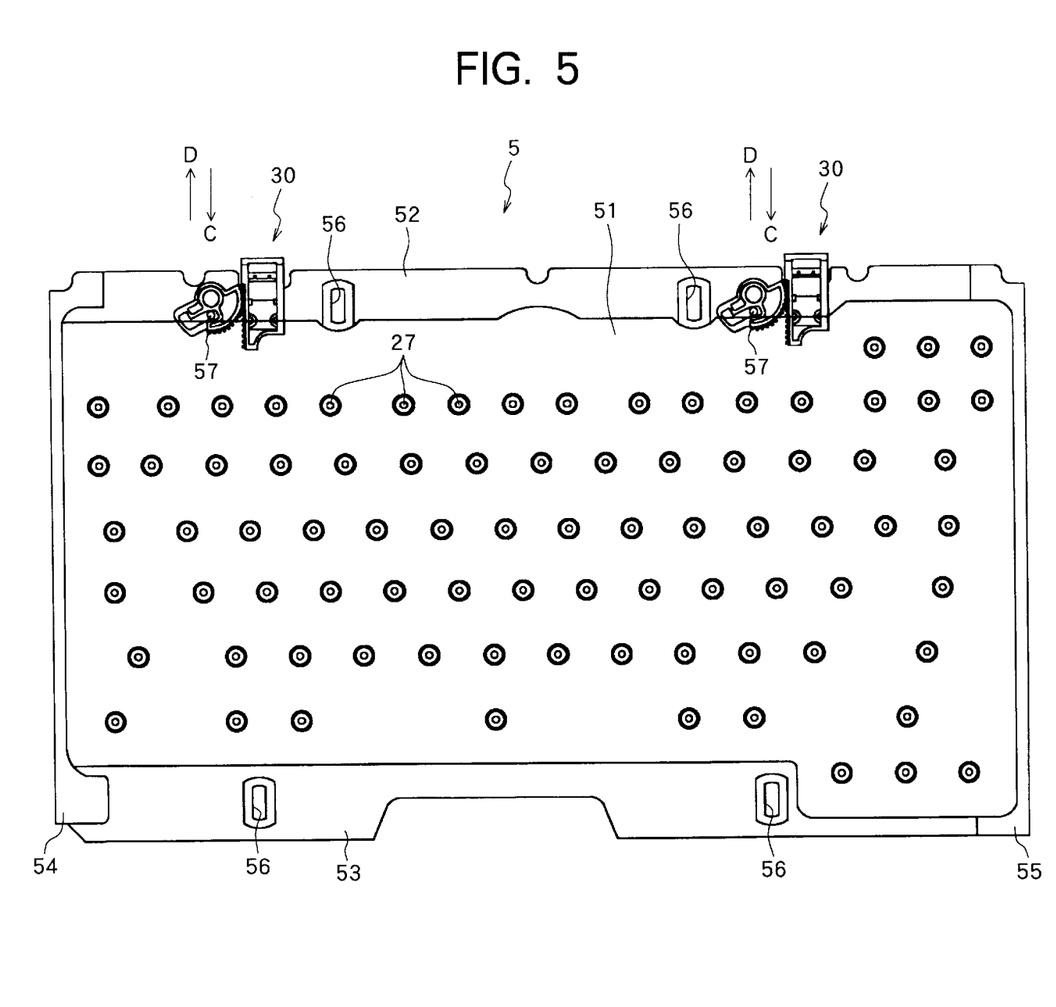
FIG. 5 is an explanatory diagram showing the association of the circuit board and a slide interlocking mechanism.

FIG. 5 is a plan view of a circuit board 5, showing the association of the circuit board and a slide interlocking mechanism 30 described later. The arrows C and D in FIGS. 2 and 5 indicate the sliding directions of the circuit board 5.

The circuit board 5 includes a flexible circuit board 51 having a polyethylene terephthalate (PET) film or the like, which is formed with a prescribed pattern; reinforces 52 and 53 fixed to two opposing sides of the flexible circuit board 51; connectors 54 and 55 for connecting the reinforces 52 and 53 together on both sides; guide slots 56 formed in the reinforces 52 and 53 for guiding the circuit board 5 in the sliding directions C and D; a pair of operating pins 57 for affecting the slide of the circuit board 5; and fixed electrodes 27 disposed on the surface of the flexible circuit board 51.

As shown in FIG. 2, the circuit board 5 is slidably supported on top of the supporting plate 7. The holder member 4 and supporting plate 7 are joined together by caulking or screws at a plurality of locations between the two, such that a prescribed space slightly larger than the thickness of the circuit board 5 is formed between the two. By forming this space between the holder member 4 and the supporting plate 7, the circuit board 5 is able to slide on top of the supporting plate 7. This sliding movement is performed when the open/close cover 62 of the keyboard device 61 is opened or closed. This process will be described in greater detail later.

When viewed from the top, the flexible circuit board 51 is approximately rectangular in shape. The fixed electrodes 27 are provided on the surface of the flexible circuit board 51 corresponding to positions at which the key switches 1 are disposed. If the flexible circuit board 51 were divided in half lengthwise, the number of fixed electrodes 27 on the side near the connector 55 would be slightly greater than the number on the side near the connector 54. Since there are more fixed electrodes 27 near the connector 55 side, frictional resistance caused by contact between the bases 12 of the link members 10 and the rubber springs 6 is greater on the connector 55 side.

The reinforcers 52 and 53 and connectors 54 and 55 adhered to the sides of the flexible circuit board 51 are rigid plate-shaped members serving to reinforce the flexible circuit board 51. The reinforcers 52 and 53 are affixed to the sides of the flexible circuit board 51 that are orthogonal to the sliding directions C and D of the circuit board 5. The connectors 54 and 55 are affixed to the ends of the flexible circuit board 51 that extend in the sliding directions C and D. The reinforcers 52 and 53 and connectors 54 and 55 are joined together with caulking or screws at a plurality of locations. In this way, the reinforcers and connectors can provide rigidity to the flexible circuit board 51.

An described above, guide slots 56 are provided at two locations on each of the reinforcers 52 and 53. All four of the guide slots 56 are exactly the same size and shape. The guide slot 56 are holes that penetrate through the reinforcers 52 and 53 and are elongated in the sliding direction of the circuit board 5. The lengths of the elongated guide slots 56 must be greater than the distance in which the circuit board 5 slides in the C and D directions. Guide pins 44 (shown in FIG. 6) disposed on the holder member 4 engage in the guide slots 56. The operating pins 57 are cylindrically shaped and are fixed to the top surface of the reinforcer 52 in two locations. The function of the operating pins 57 will be described later.

As shown in FIG. 2, the rubber springs 6 cover the top of each fixed electrodes 27 and are affixed to the top of the circuit board 5. These rubber springs 6 are formed from an elastic rubber material such as silicone rubber or EPDM (ethylene-propylene diene monomer). Each rubber spring 6 included a dome portion 6a and are edge portion 6b formed around the base of the dome portion 6a. The top of the dome portion 6a is flat, and a curved surface N2 is formed along the top edge. Tho base 12 of the link member 10 is positioned on the top of the dome portion 6a, and the guiding/supporting member 3, which includes the link members 10 and 11, is maintained elastically by the dome portion 6a.

Since they are fixed to the circuit board 5, the rubber springs 6 move with the circuit board 5 when the circuit board 5 is slid. Therefore, when the rubber springs 6 are slid to the position shown in FIG. 2 (hereinafter referred to as the first position), in which the guide support members 3 are supported by the rubber springs 6, the key tops 2 are changed to the operating position. When the rubber spring 6 are slid to the position shown in FIG. 8 (hereinafter referred to as the second position), in which the rubber springs 6 are slid out from under the guide support members 3, the key top 2 are lowered to the non-operating position.

A movable electrode 26 formed from a conductive rubber is fixed to the inner top wall of the dome portion 6a. The edge portion 6b provided at the base of the dome portion 6a is fixed to the circuit board 5. The fixed electrode 27 is positioned below the movable electrode 26. When the key top 2 is pressed down, the movable electrode 26 short-circuits the fixed electrode 27 to perform a switching operation.

When the rubber spring 6 is in the second position and the circuit board 5 is slide, the curved surface N2 works in cooperation with the curved surface N1 to guide the guiding/supporting member 3 smoothly upward. Hence, the curved surfaces N1 and N2 reduce the amount of frictional resistance caused by contact between the rubber springs 6 and the bases 12 of the link members 10, as the circuit board 5 to being slid. Accordingly, the circuit board 5 can be smoothly slid in the sliding directions.

Next, the supporting plate 7 will be described with reference to FIGS. 2, 6, and 7.

Figure 6:
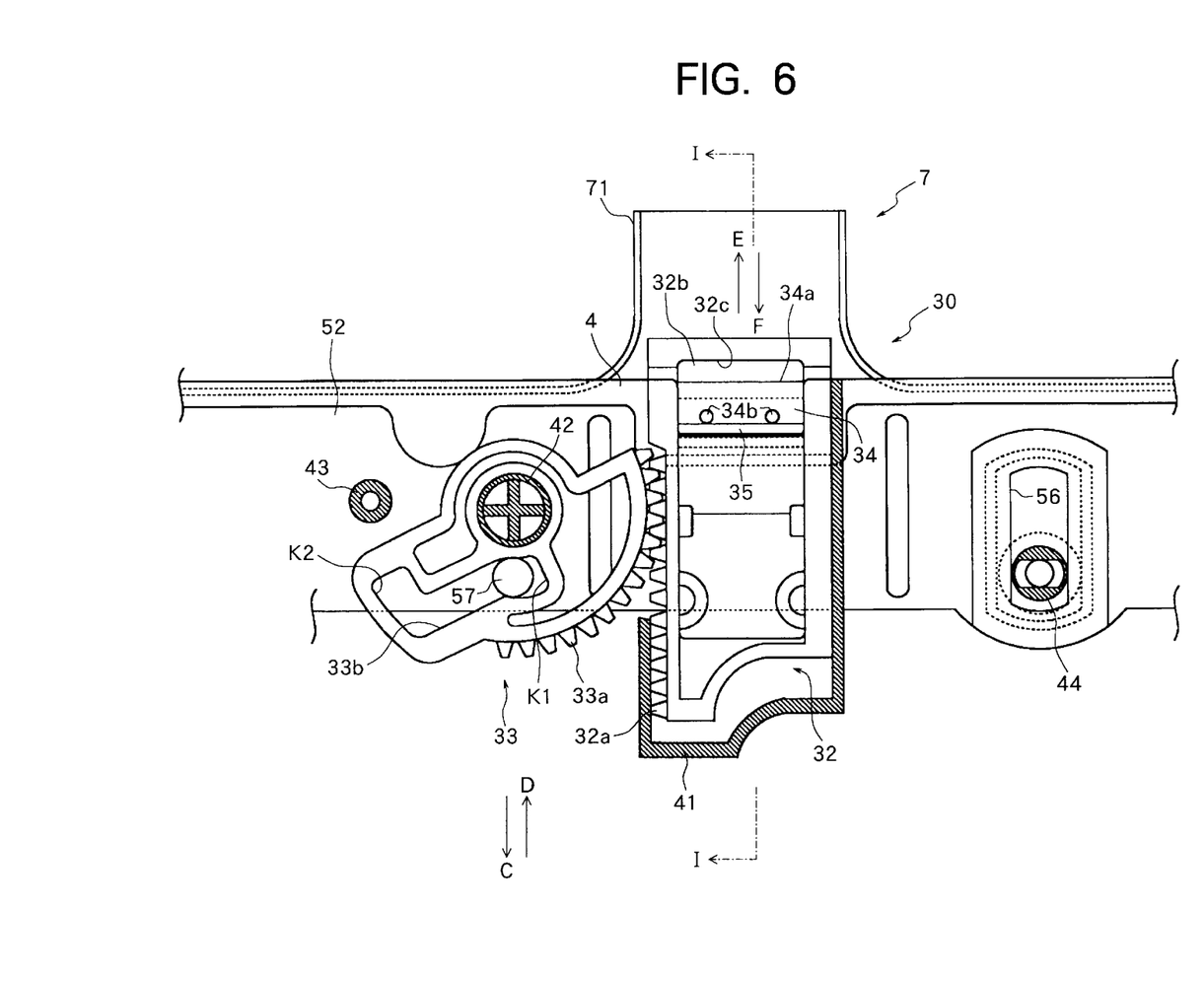
FIG. 6 is a plan view of the slide interlocking mechanism.

FIG. 6 is a plan view of the slide interlocking mechanism 30 when the open/close cover 62 is opened at least a specified angle A (see FIG. 7) from the position the open/close cover 62 is in when completely closed. The holder member 4 is depicted transparently in order to show the slide interlocking mechanism 30 underneath.

Figure 7:
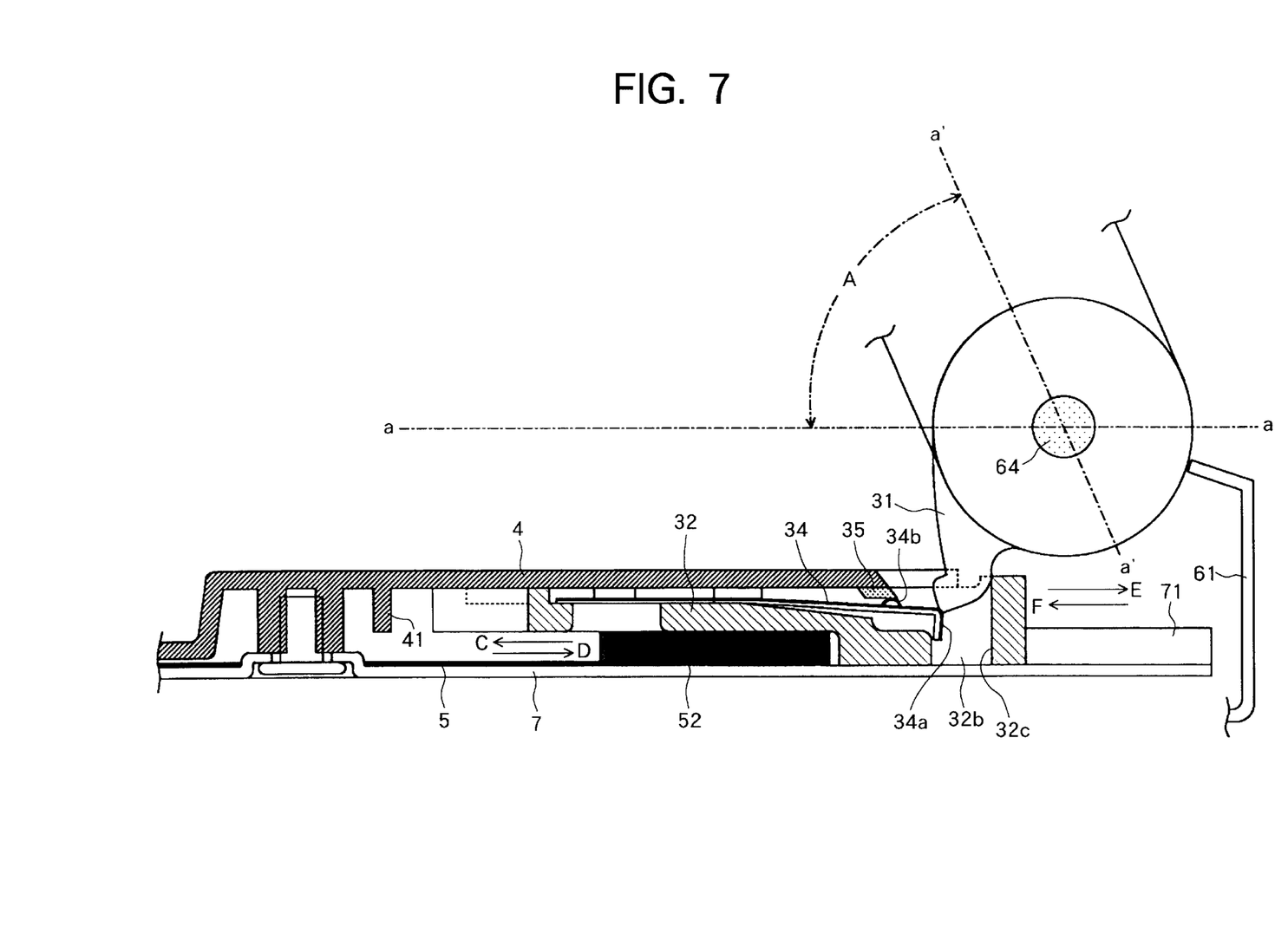
FIG. 7 is a side cross-sectional view of the slide interlocking mechanism at the plane and direction indicated by the arrows I in FIG. 6.

FIG. 7 is a side cross-sectional view of the word processor 60 along the plane and in the direction indicated by the arrows I in FIG. 6, showing the state of the word processor 60 when the open/close cover 62 is opened a prescribed angle A from the closed position.

The arrow C and D in the FIGS. 6 and 7 indicate the directions, in which the circuit board 5 slides, while the arrows E and F indicate the directions in which a rack 32 described later slides.

As shown in FIG. 2, the supporting plate 7 is approximately plate shaped. As described above, the circuit board 5 to slidably disposed on top of the supporting plate 7.

As shown in FIGS. 6 and 7, a rack moving unit 71 is formed on one and of the supporting plate 7 for guiding the rack 32 described later. The rack moving unit 71 is formed as one unit with the supporting plate 7 in the shape of the letter U, when viewed in the direction F. The bottom surface of the rack 32 contacts and is supported on the top surface of the supporting plate 7 and is capable of sliding along the top surface of the supporting plate 7. Hence, the rack 32 slides in the directions E and F without tilting in a direction orthogonal to these directions E and F.

Next, the operations of the key switches 1 having the construction described above will be described. When a key top 2 is pressed down from a non-pressed position, the sliding pins 14 on the link member 10 slide left (in FIG. 2) along the slots 8a of the anchor units 8, while the engaging pins 15 rotate in the counterclockwise direction within the engaging holes 25a of the anchor units 25. At the same time, the engaging shaft 20 on the link member 11 rotates in the clockwise direction within the engaging holes 98 of the anchor units 9, while the sliding pins 19 slide left along the slots 24a of the anchoring units 24. During this time the key top 2 moves downward while maintaining a horizontal disposition at all times through the cooperative work of the link members 10 and 11.

While the coy top 2 is moving downward, the base 12 of the link member 10 gradually pushes down the dome portion 6a of the rubber spring 6. When the amount of force pressing an the key top 2 exceeds a fixed limit, the dome portion 6a gives off a click sensation and buckles, that is, it gives under the pressure. When the dome portion 6a buckles, the moverable electrode 26 fixed to the inner top wall of the dome portion 6a short-circuits the fixed electrode 27 formed on top of the circuit board 5, turning the fixed electrode 27 on. Hence, pushing down the key top 2 performs an operation to turn on the fixed electrode 27.

When the key top 2 is released, the base 12 of the link member 10 is urged upward via an elastic returning force applied by, the rubber spring 6. At this time, the sliding pins 14 slide in the right direction (of FIG. 2) along the slots 8a of the anchor units 8, while the engaging pins 15 rotate clockwise within the engaging holes 25a of the anchor units 25. At the same time, the engaging shaft 20 rotates in the counterclockwise direction within the engaging holes 9a of the anchor units 9, while the sliding pins 19 slide in the right direction along the slots 24a of the anchoring units 24.

While the dome portion 6a gradually returns to its original position, the movable electrode 26 separates from the fixed electrode 27, turning the fixed electrode 27 off. Hence, the key top 2 is returned to its original non-depressed condition shown in FIG. 2 by the elastic force of the rubber spring 6. As when the key top 2 is pushed down, the key top 2 is maintained in a horizontal disposition while moving upward, according to the cooperative work of the link members 10 and 11.

Figure 8:
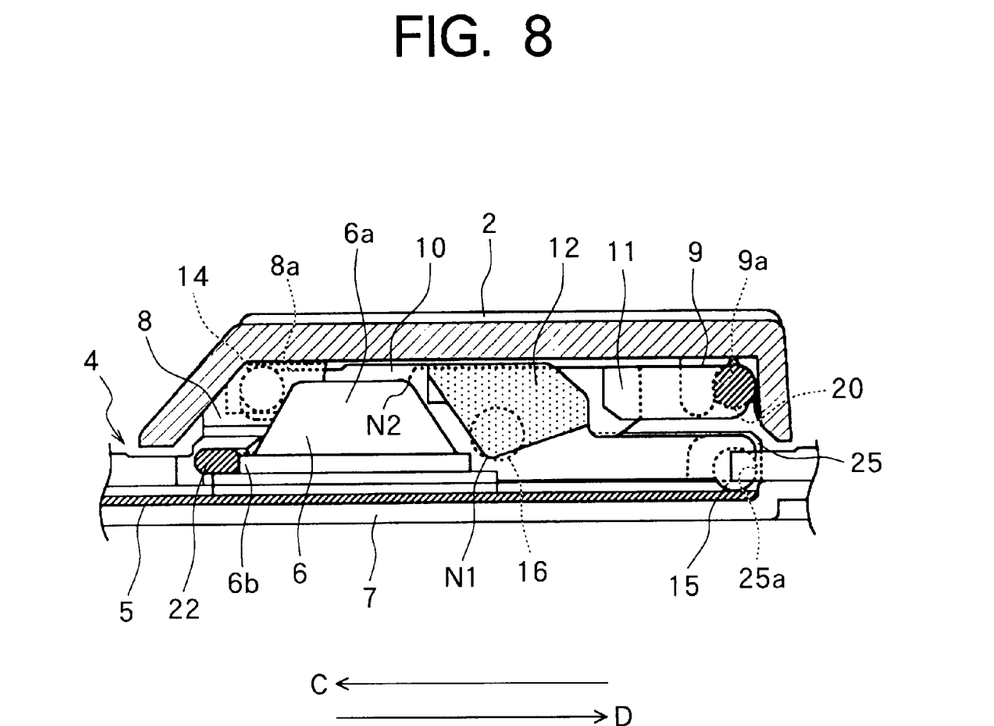
FIG. 8 is a partial side cross-sectional view of a key switch when the open/close cover is in the closed position and the key tops are in the non-operating position.

Next, the operation for moving switching the key tops 2 to the non-operating position to increase the portability of the key switches 1 will be described with reference to FIGS. 2 and 8. FIG. 8 is a partial side cross-sectional view showing the state of the key switch 1 when the open/close cover 62 is in the closed position and the key tops are in the non-operating position.

When the open/close cover 62 is opened from the closed position, at the angle indicated by the line a in FIG. 7, to the prescribed angle A, indicated by the line a' in FIG. 7, the circuit board 5 is in the first position and the key tops 2 are supported in the operating position.

From this position, the circuit board 5 is slid in the direction C, according to the work of the slide interlocking mechanism 30 described later. The rubber spring 6, which is fixed to the circuit board 5, moves along with the circuit board 5 in the direction C and gradually moves out from under the base 12 of the link member 10. During this movement, the curved surface N1 of the base 12 contacts the curved surface N2 of the dome portion 6a.

An the surface N1 slides down along the surface N2. the link members 10 and 11 that are elastically and upwardly urged by the rubber spring 6 begin to pivot via the pivot shafts 16 and pivot holes 21, rotating downward. As the link members 10 and 11 pivot downward, the engaging shaft 20 rotates in the engaging holes 9a and the sliding pin 14 slide along the slots 8a in the direction C, thereby causing the key top 2 to gradually lower from the height shown in FIG. 2 to that shown in FIG. 8. At the moment the base 12 of the link member 10 comes completely off the dome portion 6a, each of the link members 10 and 11 have rotated downward into a collapsed position on top of the circuit board 5. The key top 2 is no longer receiving any urging force from the rubber spring 6 and is in the lowest position, that is, the non-operating position.

As shown in FIG. 8. at this time, the rubber spring 6 is completely housed under the front portion 2A of the key top 2. Hence, when sliding the circuit board 5 and rubber spring 6 to lower the key top 2 into its non-operating position, the rubber spring 6 is slid under the front portion 2A, which is longer than the back portion 2B. As a result, the rubber spring 6 is reliably prevented from being contacted and deformed by the key top 2. Accordingly, the properties of the rubber spring 6 can be maintained over a long period of time. In addition, since the connecting unit 22 is arc-shaped to fit the shape of the rubber spring 6, the rubber spring 6 can be slid smoothly without contacting the guiding/supporting member 3.

When returning the key tops 2 to the operating position to used the key switches 1, the operations described above are executed in reverse order. As shown in FIG. 8. the circuit board 5 is slid in the direction D according to the work of the slide interlocking mechanism 30 described later. The dome portion 6a of the rubber spring 6 moves with the circuit board 5 and begin to slide under the base 12 of the link member 10 until the base 12 rests on top of the dome portion 6a. Through this operation, each of the link members 10 and 11 are forced to pivot from their lowest positions upward to their original positions. As the link members 10 and 11 move upward, each of the key tops 2 gradually return to the original operating position shown in FIG. 2. As described above, the link member 10 is guided smoothly upward by the work of the curved surfaces N1 and N2, which reduce the resistance generated when the dome portion 6a slides under the link member 10.

Next, the slide interlocking mechanism 30 will be described with reference to FIGS. 1. 5, 6, and 7. The slide interlocking mechanism 30 functions to slide the circuit board 5 in response to opening and closing operations of the open/close cover 62.

As shown In FIG. 5, the slide interlocking mechanisms 30 engage with each of the pair of operating pins 57 fixed to the reinforcer 52 of the circuit board 5. However, since each of the slide interlocking mechanisms 30 has the same construction and operations, the construction and operations for only one of the slide interlocking mechanisms 30 will be described.

As shown in FIG. 6, the slide interlocking mechanism 30 Includes a pawl 31 (see FIG. 7) fixed to the supporting shaft 64; a rack 32 disposed on the holder member 4; a cam gear 33 also disposed on the holder member 4, a flat spring 34 disposed on the rack 32 for engaging the pawl 31 on the rack 32; a depressing plate 35 for releasing the engaged state of the pawl 31 and rack 32; a guide member 41 for guiding the rack 32 in a sliding direction; a supporting shaft 42 for rotatably supporting the cam gear 33; a stopper 43 for restricting excess rotation of the cam gear 33; and a guide pin 44 engaged in the guide slot 56 for guiding the reinforcer 52 of the circuit board 5 in a sliding direction.

As shown in FIG. 7, the pawl 31 is fixed to the supporting shaft 64. As described above, the supporting shaft 64 supports the open/close cover 62 via the hinges 63 such that the open/close cover 62 can open and close. Therefore, the pawl 31 rotates in the same way as the supporting shaft 64 according to the open and close operations of the open/close cover 62. In other words, the pawl 31 rotates in the clockwise direction of FIG. 7 when the user opens the open/close cover 62 and in the counterclockwise direction when the user closes the open/close cover 62.

An shown in FIG. 7, the rack 32 is disposed between the holder member 4 and the reinforcer 52 of the circuit board 5 and is shaped approximately rectangular in a plan view. The rack 32 slides horizontally in the directions E and F according to rotations of the pawl 31 described above. A plurality of rack teeth 32a well known in the art is formed on one side of the rack 32. A depression 32b is rectangular shaped in plan view and penetrates through one and of the rack 32 in order to transfer the rotating operations of their pawl 31 to the rack 32. An inner wall 32a forms one side of the depression 32b. When the open/close cover 62 1s in the closed position, the pawl 31 fixed on the supporting shaft 64 is positioned within the depression 32b and contacts the inner wall 32c. The pawl 31 remains engaged in the depression 32b of the rack 32 while the open/close cover 62 is not opened far enough for the user to operate the keys or, more specifically, while the open/close cover 62 is between the closed position, indicated by the line a in FIG. 7. and a prescribed angle A, indicated by the line a' in FIG. 7.

An shown in FIG. 6, the cam gear 33 is provided with a plurality of gear teeth 33a and a cam groove 33b. The gear teeth 33a are disposed on an arcing portion of the cam gear 33 for engaging with the rack teeth 32a. Hence, when the rack moves in the directions E and F, the movement is transferred to the cam gear 33 via the engagement of the rack teeth 32a and the gear teeth 33a. These gear teeth 33a are only provided on an arc portion of the cam gear 33 long enough to correspond to all the rack teeth 32a and are not provided around the entire cam gear 33. The cam groove 33b pierces all the way through the cam gear 33 and is formed in an elongated hole approximately shaped like the letter L in a plan view. The cam groove 33b engages with the operating pin 57 fixed to the circuit board 5. Hence, the sliding movement of the rack 32 is transferred to the operating pin 57, forcing the circuit board 5 to slide in the opposite direction of the rack 32. When sliding is performed, the operating pin 57 slides within the cam groove 33b between engaging positions K1 and K2. The distance between K2 and the center point of the supporting shaft 42 is twice that between K1 and the center point of the supporting shaft 42.

The cam gear 33 is rotatably supported by the supporting shaft 42 protruding beneath the holder member 4. When sliding movement of the rack 32 in transferred to the gear teeth 33a via the rack teeth 32a, the cam gear 33 rotates around the supporting shaft 42. This rotation causes the operating pin 57 to slide within the cam groove 33b in the sliding directions C and D. Hence, the circuit board 5 is forced to slide in the same directions, along with the reinforcer 52 fixed to the operating pin 57.

The gear teeth 33a and cam groove 33b of the cam gear 33 are formed in such a way that the distance in which the rack 32 slide in the E (or F) direction is twice as far as the distance in which the circuit board 5 slides in the C (or D) direction. However, since amount of movement required to slide both the rack 32 and the circuit board 5 in their respective directions is approximately equal, the driving force necessary to move the rack 32 in the E (or F) direction is approximately half the force necessary to move the circuit board 5 in the C (or D) direction.

For example, if the circuit board 5 having a load of about 1.9 kgf in the D (or C) direction is slid about 5 mm in the C (or D) direction, then the rack 32 should be slid about 10 mm in the E (or F) direction by a driving force of about 0.95 kgf. In the present embodiment, a pair of the slide interlocking mechanisms 30 are engaged with a pair of the operating pins 57. Therefore, a driving force of about 0.475 kgf must be provided to each of the slide interlocking mechanisms 30 in order to slide the circuit board 5. That is, the driving force on each of the slide interlocking mechanisms 30 can be an low as one-fourth that necessary to slide the circuit board 5.

As shown in FIG. 7, the flat spring 34 formed in an approximate L shape when viewed from the side and is constructed of an elastic steel plate. One and of the plate is mounted on the top surface of the rack 32. An end 34a on the opposite end protrudes into the depression 32b of the rack 32. Hemispheric shaped protrusions 34b are formed on the upper surface of the flat spring 34 near the end 34a. The top of the protrusions 34b contact the depressing plate 35 disposed on the lower surface and end of the holder member 4. These protrusions 34b are disposed in two positions (sea FIG. 6) along the line a of FIG. 7. The end of the pawl 31 contacts the bent portion of the flat spring 34, bending the flat spring 34 in the lengthwise center and displacing the end 34a in a downward direction. The depressing plate 35 is shaped like a rhomboid when seen from the side and is disposed on the underside and end of the holder member 4, one acute angle portion of the depressing plate 35 points toward the depression 32b.

As shown in. FIG. 6, the guide member 41 is a thin plate-shaped wall member that protrudes downward from the bottom surface of the holder member 4 (see FIG. 7) and partially surrounds the rack 32, contacting both sides of the same. Hence, the rack 32 is guided in the sliding directions by the guide member 41. Therefore, the rack 32 can be maintained level while sliding and does not become inclined. Further, when the rack 32 is slid in the F direction, the guide member 41 prevents the rack 32 from sliding too far.

As shown in FIG. 6, the stopper 43 is cylindrically shaped and protrudes downward from the lower surface of the holder member 4. The stopper 43 in positioned on the side of the cam gear 33 opposite the rack 32 above the cam gear 33 when the cam gear 33 has rotated to its moat extended position along the rotating path. That is, when the cam gear 33 in rotated in the clockwise direction, the stopper 43 side of the cam gear 33 collides with the stopper 43 and is prevented from rotating any further, thereby maintaining the engaged condition of the rack teeth 32a and the gear teeth 33a.

An shown in FIG. 6, the guide pin 44 is cylindrically shaped and protrudes in a downward direction from the lower surface of the holder member 4. The lower end of this guide pin 44 is joined with the upper surface of the supporting plate 7 via plastic reformation or a screw. As a result, a gap in formed between the holder member 4 and the supporting plate 7 (see FIG. 7). Accordingly, the circuit board 5 can slide over the surface of the supporting plate 7 via the gap formed between the holder member 4 and the supporting plate 7. The guide pin 44 contacts the walls of the guide slot 56 and is engaged in the same. A guide pins 44 is slidably engaged in each of tho guide slots 56 (see FIG. 5), which penetrate both the reinforcers 52 and 53 in two locations each.

Since the rubber springs 6 fixed to the circuit board 5 are not equally distributed, the frictional resistance generated by contract between the link members 10 and the rubber springs 6 will be greater on the connector 55 side of the circuit board 5 (see FIG. 5). For this reason, a disparity will exist between the driving forces acting on the operating pins 57 when the circuit board 5 is slid, urging the circuit board 5 toward the connector 54 side. However, in the present embodiment, the reinforcer 52 is maintained evenly and always orthogonal to the direction of movement by the engaged sliding of the guide pins 44 and the guide slots 56, thereby preventing the circuit board 5 from sliding in a skewed direction.

Next, the operations of a slide interlocking mechanism 30 having the configuration described above will be described with reference to FIGS. 2, 6, 7, and 8.

First, a description will be given for the operations of the key switches 1 and the slide interlocking mechanism 30 when the open/close cover 62 is opened to a prescribed angle A, indicated by the line a' in FIG. 7, from the closed position, indicated by the line a in FIG. 7. When the open/close cover 62 is opened to the prescribed angle A, the rack 32 and the circuit board 5 fixed to the reinforcer 52 are positioned as shown in FIGS. 6 and 7. The key tops 2 of the key switches 1 are now in the operating position shown in FIG. 2.

As shown In FIG. 7, the pawl 31 fixed to the supporting shaft 64 is positioned within the depression 32b and contacts the inner wall 32c of the depression 32b. The pair of protrusions 34b of the flat spring 34 contact and slip underneath the depressing plate 35. As a result, the lengthwise center portion of the flat spring 34 bends and the and 34a in displaced downward. Since there are no obstacles in the rotational path of the pawl 31 when the pawl 31 rotates in the clockwise direction, when the open/close cover 62 is opened in the clockwise direction greater than the prescribed angle A, the pawl 31 rotates in the clockwise direction simultaneously. Therefore, the pawl 31 separates from the end 34a of the flat spring 34 and the inner wall 32c of the depression 32b and moves out of the depression 32b. Accordingly, the association of the pawl 31 and the rack 32 is disabled and the key tops 2 of the key switches 1 are maintained in the operating position shown in FIG. 2.

Next, the operations of the key switches 1 and the slide Interlocking mechanisms 30 when the open/close cover 62 is pivoted from the prescribed angle A to the closed position will be described with reference to FIGS. 2, 6, 7, and 8.

When the open/close cover 62 is at the prescribed angle A from the closed position, an shown in FIGS. 6 and 7, and is rotated counterclockwise toward the closed position, the pawl 31 fixed to the supporting shaft 64 also rotates in the counterclockwise direction along with the open/close cover 62. One side of the pawl 31 contacts the inner wall 32c of the rack 12 when rotating counterclockwise, applying a force to the rack 32 in the direction E indicated in the drawings.

The force applied by the pawl 31 causes the rack 32 to slide within the rack moving unit 71 in the directions E. As the rack 32 slides in the direction E, the flat spring 34 also moves in the direction E. Accordingly, the protrusions 34b, which are in contact with the underside of the depressing plate 35, move in the direction E until they separate from the depressing plate 35, thereby releasing the flat spring 34 from its bent condition. The restitutive force of the flat spring 34 urges the flat spring 34 to return to a flat condition. As the pawl 31 rotates further in the counterclockwise direction, the flat spring 34 returns to a flat condition and the pawl 31 becomes engaged in the depression 32b between the end 34a of the flat spring 34 and the inner wall 32c of the depression 32b. Hence, the open/close cover 62 reaches the closed position, indicated by the line a in FIG. 7, at the same time the rack 32 slides over the rack moving unit 71 to the end of the supporting plate 7.

As shown in FIG. 6, as the rack 32 slides in the direction E, the cam gear 33 rotates in the counterclockwise direction. The cam groove 33b moves in the rotated direction of the cam gear 33, forcing the operating pin 57 engaged in the cam groove 33b to slide from the engaging position K1 to the engaging position K2. While the operating pin 57 slides relative to the cam groove 33b, sliding of the circuit board 5 orthogonal to the direction C in corrected by the engaged condition of the guide slots 56 and the guide pins 44. Therefore, the operating pin 57 is pressed against the supporting shaft 42 side of the cam groove 33b and slid in the C direction, relative to the cam groove 33b, to the engaging position K2. Accordingly, the reinforcer 52 on which the operating pin 57 is fixed and the circuit board 5 are slid in the direction C. As a result, the circuit board 5 is slid to the first position, described above, and the key tops 2 of the key switches 1 are changed to the non-operating position shown in FIG. 8.

Next, the operations of the key switches 1 and the slide interlocking mechanisms 30 when the open/close cover 62 is pivoted from the closed position to the prescribed angle A will be described with reference to FIGS. 2, 6, 7, and 8.

The operations of the key switches 1 and the slide interlocking mechanisms 30 when opening the open/close cover 62 to the prescribed angle A are opposite those described above when closing the open/close cover 62 to the is closed position. As the open/close cover 62 is opened, the supporting shaft 64 and the pawl 31 fixed to the supporting shaft 64 rotate in the clockwise direction. This movement causes the pawl 31, which is engaged between the end 34a of the flat spring 34 and the inner wall 32c, to apply force to the and 34a. Since the flat spring 34 is mounted on the rack 32, the race 32 is forced to slide in the direction F by the force on the end 34a.

As the rack 32 slides in the direction F, the cam gear 33 in forced to rotate in the clockwise direction. The cam groove 33b likewise moves in the clockwise direction. Accordingly, the operating pin 57 engaged in the cam groove 33b at the engaging position K2 slides relative to the cam groove 33b toward the engaging position K1. While the operating pin 57 slides relative to the cam groove 33b, sliding of the circuit board 5 orthogonal to the direction D is corrected by the engaged condition of the guide slots 56 and the guide pins 44. Therefore, the operating pin 57 is slid in the D direction, relative to the cam groove 33b, toward the engaging position K1. Accordingly, the reinforcer 52 on which the operating pin 57 is fixed and the circuit board 5 are slid in the direction D. As a result, the circuit board 5 is slid to the second position described above, and the key tops 2 of the key switches 1 are changed to the operating position shown in FIG. 2.

As the rack 32 slides in the direction F, the flat spring 34 also moves in the direction F, causing the protrusions 34b to slide under the depressing plate 35. As a result, the lengthwise center portion of the flat spring 34 bonds and the end 34a is displaced downward. Since there are no obstacles in the rotational path of the pawl 31 when the pawl 31 rotates in the clockwise direction, the open/close cover 62 can be opened in the clockwise direction to an angle greater than the prescribed angle A. Since the protrusions 34b on the flat spring 34 are provided in two positions of equal distance in the direction F, an even amount of force is applied to the flat spring 34 when the protrusions 34b slide under the depressing plate 35. Hence, the flat spring 34 does not tilt to one side, but bonds downward evenly. Further, the hemispherical shape of the protrusions 34b allows the same to slide smoothly, under the depressing plate 35.

While the invention has been described in detail with reference to specific embodiments thereof, it would be apparent to those skilled in the art that many modifications and variations may be made therein without departing from the spirit of the invention, the scope of which is defined by the attached claims.

For example, in the embodiment described above, the key switches 1 are configured such that when a key top 2 is pressed the movable electrode 26 fixed to the inner top surface in the dome portion 6a of the rubber spring 6 contacts the fixed electrode 27 formed on top of the circuit board 5. However, these key switches 1 can be configured with a membrane switch, which includes a spacer between two switching sheets, on the bottom surface of the holder member 4 and a pressing unit on the inner top surface of the dome portion 6a.

As described in the embodiment above, each of the guiding/supporting members 3 is configured to open and close in a scissors-like pivoting movement by rotatably fitting the pivot shafts 16 of the link members 10 in the pivot holes 21 of the link members 11. However, this particular association does not necessarily need to be used. For example, this link members can be joined by slidably fitting a pivot shaft of one link member into an elongated pivot hole in the other link member, such that both link members are capable of folding upward and downward.

As described in the embodiment above, the rubber springs 6 are pressed downward by the guiding/supporting members 3. However, it is possible to form a protrusion on the underside of each of the key tops 2 to press on the top of the rubber springs 6.

As described in the embodiment above, the circuit board 5 is guided in the sliding directions by the engagement of the guide pins 44 and the guide slots 56. However, it is also possible to dispose guide members on the holder member 4 or the supporting plate 7 and in contact with the lengthwise sides of the connectors 54 and 55 for guiding the circuit board 5 in the sliding directions.

As described in the embodiment above, the reinforcers 52 and 53, which are fixed to opposing sides of the flexible circuit board 51 in order to reinforce the rigidity of the circuit board 5, are connected by connectors 54 and 55. However, it is also possible to connect the reinforcers 52 and 53 with a single connector between the lengthwise center points of those reinforcers 52 and 53, forming an H shape. Further, it is possible to dispose guide members on either the holder member 4 or the supporting plate 7 and in contact with the lengthwise side of one of the reinforcers for guiding the circuit board 5 in the sliding directions.

As described above, a driving force applied by the driving device is amplified and transferred by the driving force amplifying device. The amplified force is transferred to either the slide member or the holder member in order to slide the slide member in relation to the holder member. Accordingly, the driving force needed to slide the slide member from a first position to a second position is smaller than that in conventional keyboard devices.

An described above, a driving force provided by rotating the open/close cover is amplified by the rack members and cam gear members and transferred to the slide member or holder member. Accordingly, the driving force needed to open mad close the open/close cover is decreased, facilitating these opening and closing operations.

As described above, the pawls engage in a state of no load with the depressions of the rack members when the open/close cover is in the closed position. Therefore, the gradual creep caused by load between the pawls and depressions or by high temperatures can be prevented and, as a result, need not be considered during tho design stage. Accordingly, it is possible to reduce restrictions in the design and incorporate lighter materials to form the parts.

An described above, when the open/close cover reaches the prescribed angle from the closed position, the elastic members are elastically deformed according to a load applied by the releasing devices, and the pawls are disengaged from the elastic members. At this point, the association of the rack members and the cover in disengaged. Accordingly, the cover can open beyond the prescribed angle from the closed position without further driving the rack members. During the process of closing the cover, when the cover reaches this prescribed angle from the closed position, the load applied by the releasing devices is canceled, allowing the elastic members to return to a flat condition according to tho restitutive force of the elastic members themselves, thereby re-engaging the pawls and the elastic members. Accordingly, the rack members again operate in association with the cover.

As described above, the pair of reinforcing members are provided on the elastic body and are connected by the at least one connecting member in order to increase the rigidity of the slide member. An result, the elastic body can slide without bending when the slide member slides relative to the holder member.

As described above, since the first guiding members are disposed on the holder member and contacts the side surfaces of the connecting members, the slide member can be prevented from varying in a direction orthogonal to the sliding direction when the slide member slides relative to the holder member.

An described above, since the surfaces of the key tops or guiding/supporting members and the switching members that contact each other are curved, the slide member can slide smoothly relative to the holder member according to these curved surfaces.

As described above, since the second guiding members guide the slide member in the sliding direction, the slide member can slide relative to the holder member without varying in a direction orthogonal to the sliding direction.

What is claimed is:

1. A keyboard device comprising;

key tops;

a guiding/supporting member that supports the key tops and guides the key tops in a vertical movement;

a holder member that supports the guiding/supporting member;

a slide member disposed beneath the holder member;

switching means disposed on the slide member for performing a switching operation according to downward movement of the key tops;

driving means for sliding the slide member relative to the holder member and between a first position, in which the key tops are disposed upward, and a second position, in which the key tops are disposed downward; and driving force amplifying means for amplifying driving force of the driving means and transferring amplified driving force to at least one of the slide member and the holder member.

2. A keyboard device as claimed in claim 1, wherein the driving force amplifying means comprises:

an open/close cover rotatably supported via a supporting shaft between a closed position and an open position;

a pawl disposed on the open/close cover;

a rack member formed with a depression for engaging with the pawl and having gear teeth;

an operating pin disposed on the slide member; and a cam gear member operatively connected to the operating pin and formed with a cam portion having gear teeth for engaging with the gear teeth of the rack member.

3. A keyboard device as claimed in claim 2, further comprising a supporting plate disposed beneath the slide member, and wherein when the open/close cover is rotatably moved, the rack slidably moved on the supporting rack in a direction opposite a direction in which the slide member slides.

4. A keyboard device as claimed in claim 1, wherein the driving force amplifying means comprises:

an open/close cover rotatably supported via a supporting shaft, between a closed position and an open position;

a pawl disposed on the open/close cover;

a rack member formed with a depression for engaging with the pawl and having gear teeth;

an operating pin disposed an the holder member; and a cam gear member operatively connected to the operating pin and formed with a cam portion having gear teeth for engaging with the gear teeth of the rack member.

5. A keyboard device as claimed in claim 2, wherein the pawl engages in a state of no load with the depression of the rack member when the open/close cover is in the closed position.

6. A keyboard device as claimed in claim 2, wherein the driving force amplifying means further comprises:

an elastic member disposed on the rack member for engaging with their pawl; and releasing means for disengaging the pawl from the elastic member when the open/close cover is rotated open more than a predetermined angle from the closed position.

7. A keyboard device as claimed in claim 1, wherein the slide member comprises:

an elastic body upon which the switching means is disposed;

a pair of reinforcing members provided one on either side of the elastic body in the sliding direction of the slide member; and at least one connecting member connecting the pair of reinforcing members, the at least one connecting member having a side surface.

8. A keyboard device as claimed in claim 7, further comprising a first guide member disposed on the holder member for contacting the side surface of the at least one connecting member and guiding the at least one connecting member in the sliding direction.

9. A keyboard device as claimed in claim 1, wherein a contacting portion of the guiding/supporting member that contacts the switching means is formed in a curved shape.

10. A keyboard device as claimed in claim 1, wherein at least two sliding grooves are formed on the slide member as elongated holes, and further comprising a second guiding member disposed on the holder member and engaged with the at least two sliding grooves for guiding slide member in the sliding direction.

11. A keyboard device as claimed in claim 10, further comprising a third guiding member disposed on their holder member and contacting the side surface of the sliding member for guiding the slide member in the sliding direction.

12. A thin electronic device comprising:

key tops;

a supporting shaft;

an open/close cover rotatably supported via the supporting shaft between a closed position and an open position, the open/close cover covering the key tops when the open/close cover is in the closed position and exposing the key tops when thee open/close cover is in the open position;

a guiding/supporting member that supports the key tops and guides the key tops in a vertical movement;

a holder member that supports the guiding/supporting member;

a slide member disposed beneath the holder member;

switching means disposed on the slide member for performing a switching operation according to downward movement of the key tops;

driving means for sliding the slide member relative to the holder member and between a first position, in which the key tops are disposed upward, and a second position, in which the key tops are disposed downward; and driving force amplifying means for amplifying driving force of the driving means and transferring amplified driving force to at least one of the slide member and the holder member.

13. A thin electronic device as claimed in claim 12, wherein the driving force amplifying means amplifies the driving force in accordance with rotatable movements of the open/close cover.

14. A thin electronic device as claimed in claim 13, wherein the driving force amplifying means comprises:

a pawl disposed on the open/close cover;

a rack member formed with a depression for engaging with the pawl and having gear teeth;

an operating pin disposed on either the slide member or the holder member; and a cam gear member operatively connected to the operating pin and formed with a cam portion having gear teeth for engaging with the gear teeth of the rack member.

15. A thin electronic device as claimed in claim 14, further comprising a supporting plate disposed beneath the slide member, and wherein when the open/close cover is rotatably moved, the rack slidably moves on the supporting plate in a direction opposite a direction in which the slide member slides.

16. A thin electronic device as claimed in claim 15, wherein the pawl engages in a state of no load with the depression of the rack member when the open/close cover is in the closed position.

17. A thin electronic device an claimed in claim 14, wherein the driving force amplifying means further comprises:

an elastic member disposed on the rack member for engaging with the pawl; and releasing means for disengaging the pawl from the elastic member when the open/close cover is rotated open more than a predetermined angle from the closed position.

18. A thin electronic device as claimed in claim 12, wherein the slide member comprises:

an elastic body upon which the switching means is disposed;

a pair of reinforcing members provided one on either side of the elastic body in the sliding direction of the slide member; and at least one connecting member connecting the pair of reinforcing members, the at least one connecting member having a aide surface.

19. A keyboard device an claimed in claim 18, further comprising a first guide member disposed on the holder member for contacting the side surface of the at least one connecting member and guiding the at least one connecting member in the sliding direction.

20. A keyboard device as claimed in claim 19, wherein a contacting portion of the guiding/supporting member that contacts the switching means is formed in a curved shape.

21. A thin electronic device as claimed in claim 19, wherein at least two sliding grooves are formed on the slide member as elongated holes, and further comprising a second guiding member disposed on the holder member and engaged with the at least two sliding grooves for guiding slide member in the sliding direction.

22. A thin electronic device as claimed in claim 21, further comprising a third guiding member disposed on the holder member and contacting the side surface of the slide member for guiding the slide member in the sliding direction.

\* \* \* \* \*